G. KIRBY.
SPUR.
APPLICATION FILED JUNE 16, 1908.

916,718.  Patented Mar. 30, 1909.

Witnesses
J. C. Miller.
B. E. Hutton.

Inventor
George Kirby,
By D. Swift & Co.
Attorneys

UNITED STATES PATENT OFFICE.

GEORGE KIRBY, OF MARYSVILLE, MONTANA.

SPUR.

No. 916,718.　　　　Specification of Letters Patent.　　　Patented March 30, 1909.

Application filed June 16, 1908. Serial No. 438,795.

*To all whom it may concern:*

Be it known that I, GEORGE KIRBY, a citizen of the United States, residing at Marysville, in the county of Lewis and Clark and State of Montana, have invented a new and useful Spur; and I do hereby declare the following to be a full, clear, and exact description of the invention, such as will enable others skilled in the art to which it appertains to make and use the same.

The invention relates to a spur and has for its object to provide a device of this character adapted for the use of riders of horses or other animals, and which is provided with means for permitting the ratchet wheel of the same to rotate in one direction and which prevents said wheel from rotating in the opposite direction.

The main object of the invention is to provide means whereby a rider in breaking in an unruly or spirited horse can lock his feet in the girth and thus hold himself securely mounted on the animal. It will be seen that the locking of the spur will enable him to tighten his grip on the animal and when the same is under control he can readily release his grip.

With these and other objects in view, the invention consists in the novel construction and arrangement of parts hereinafter described and shown and particularly pointed out in the appended claim.

Figure 1:
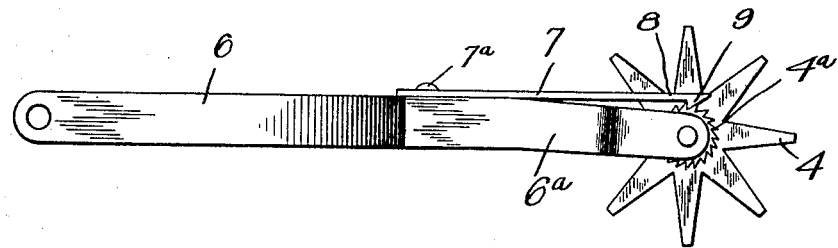
Figure 2:
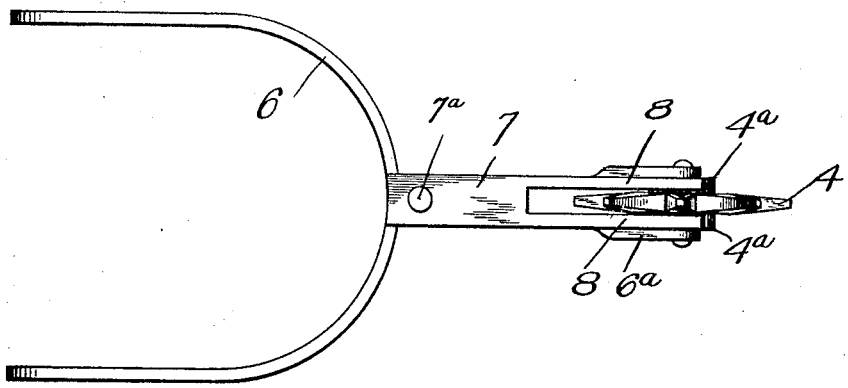

In the drawings Figure 1 is a side elevation of a spur constructed in accordance with this invention. Fig. 2 is a top plan view of the same.

Referring to the drawings, 6 designates the frame of my spur which is adapted to be secured to the heel of a shoe or boot as desired. The frame 6 is provided with a shank $6^a$, the outer end of which is bifurcated for the reception of the spur wheel 4. The spur wheel is pivotally mounted in said bifurcation as shown and on either side of which is provided a smaller ratchet wheel $4^a$. The wheels $4^a$ are rigidly connected with the wheel 4. Mounted on the top of the shank $6^a$ is a plate 7 which has a pair of resilient members 8 on the end of which is formed a pawl 9. The pawl 9 engages the ratchet wheel $4^a$ and, as will be readily seen, holds the same against rotation in one direction and permits it to rotate in the opposite direction.

It will be seen that when a rider is mounted on an indolent animal who refuses to travel as rapidly as desired and when the revolving spur wheel fails to cause the desired action, the spur wheel can be pressed in the direction which locks the same against rotation and affords a great deal more punishment to the animal than when it rotates.

It will also be seen that by this device as constructed the rider can hold himself firmly mounted on an unruly or vicious horse which would otherwise be dangerous to handle.

It will be seen that where the animal is a fairly willing traveler, the revolving spur wheel will be sufficient to cause the desired action, but when the animal is more stub-born the pain caused by the stationary wheel will be much greater than when it rotates.

What I claim is:—

A device of the class described, comprising a spur or frame, a spur wheel pivotally connected thereto, said spur wheel having a ratchet wheel on either side thereof and spring actuated pawls adapted to engage said ratchet wheel, substantially as described.

In testimony whereof I have signed my name to this specification in the presence of two subscribing witnesses.

GEORGE KIRBY.

Witnesses:
　GILBERT EDWARDSON,
　JOHN LARSON.